March 28, 1961     E. GOLD ET AL     2,977,228
METHOD OF MAKING THREE DIMENSIONAL MODELS
Filed Dec. 20, 1957     5 Sheets-Sheet 1
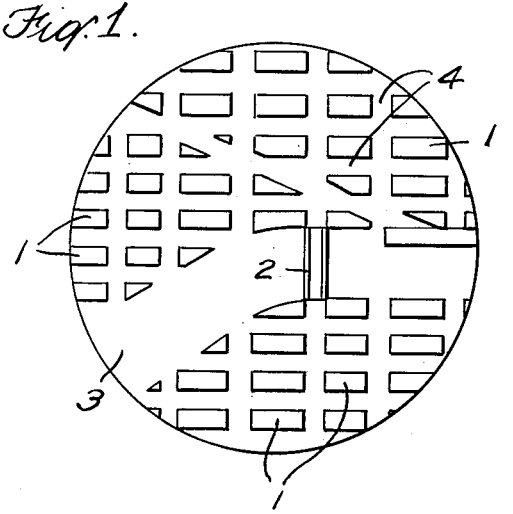
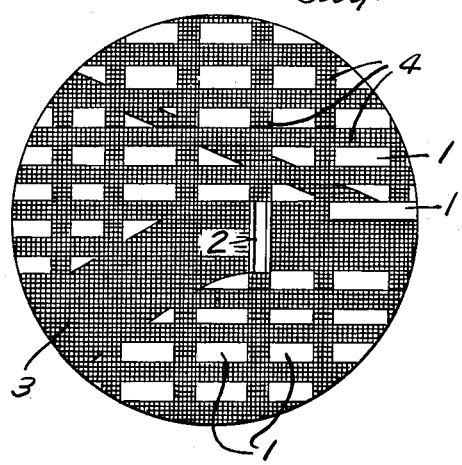
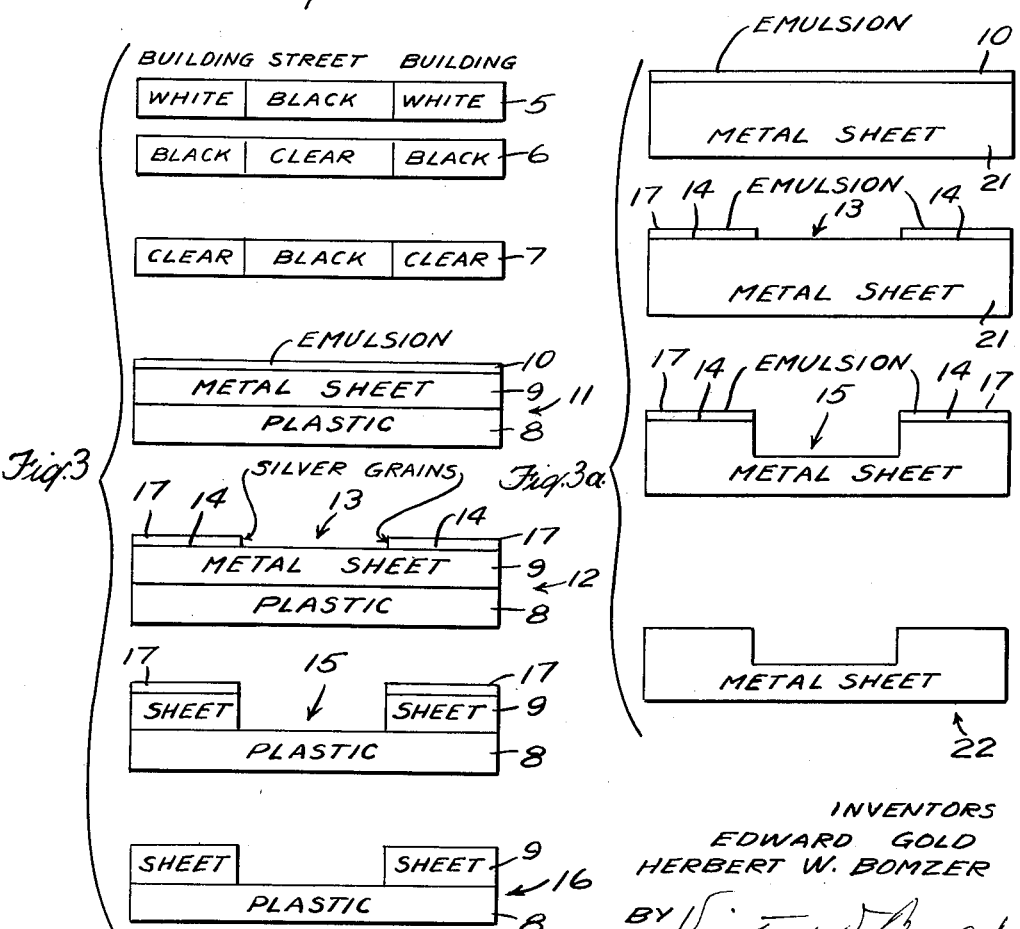
INVENTORS
EDWARD GOLD
HERBERT W. BOMZER
ATTORNEY March 28, 1961 E. GOLD ET AL 2,977,228
METHOD OF MAKING THREE DIMENSIONAL MODELS
Filed Dec. 20, 1957 5 Sheets-Sheet 2
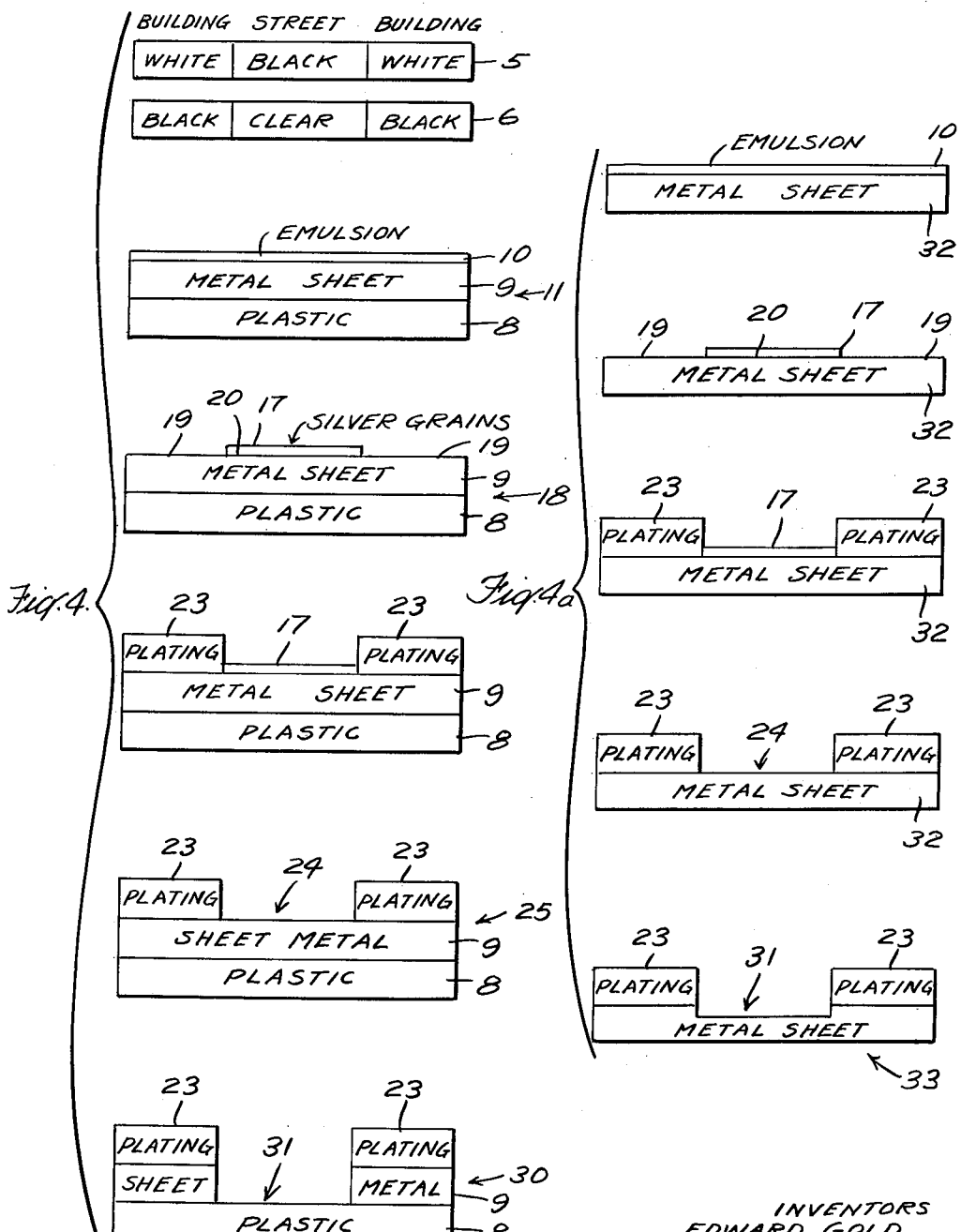
INVENTORS
EDWARD GOLD
HERBERT W. BOMZER
BY
ATTORNEY

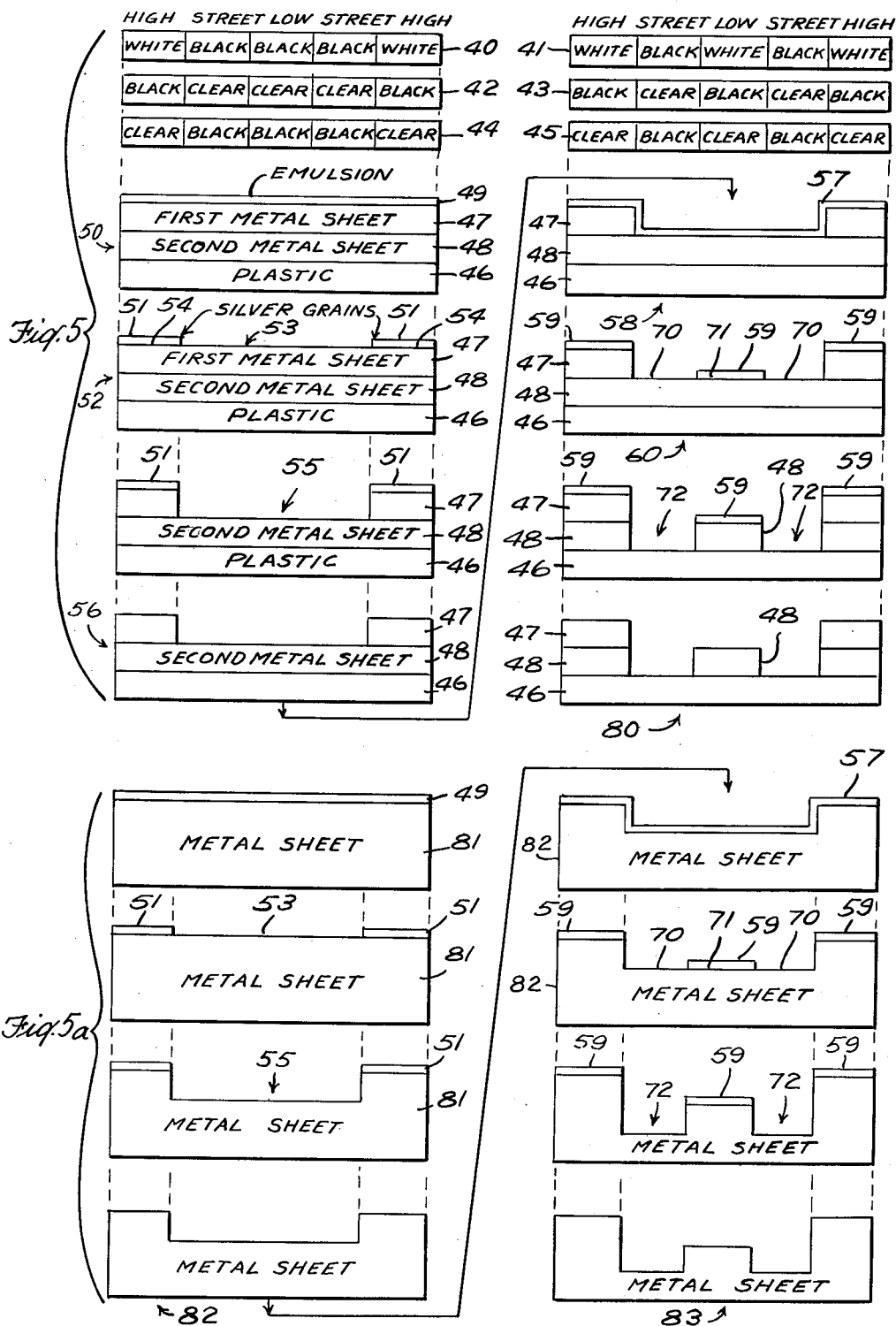

March 28, 1961   E. GOLD ET AL   2,977,228
METHOD OF MAKING THREE DIMENSIONAL MODELS
Filed Dec. 20, 1957   5 Sheets-Sheet 5
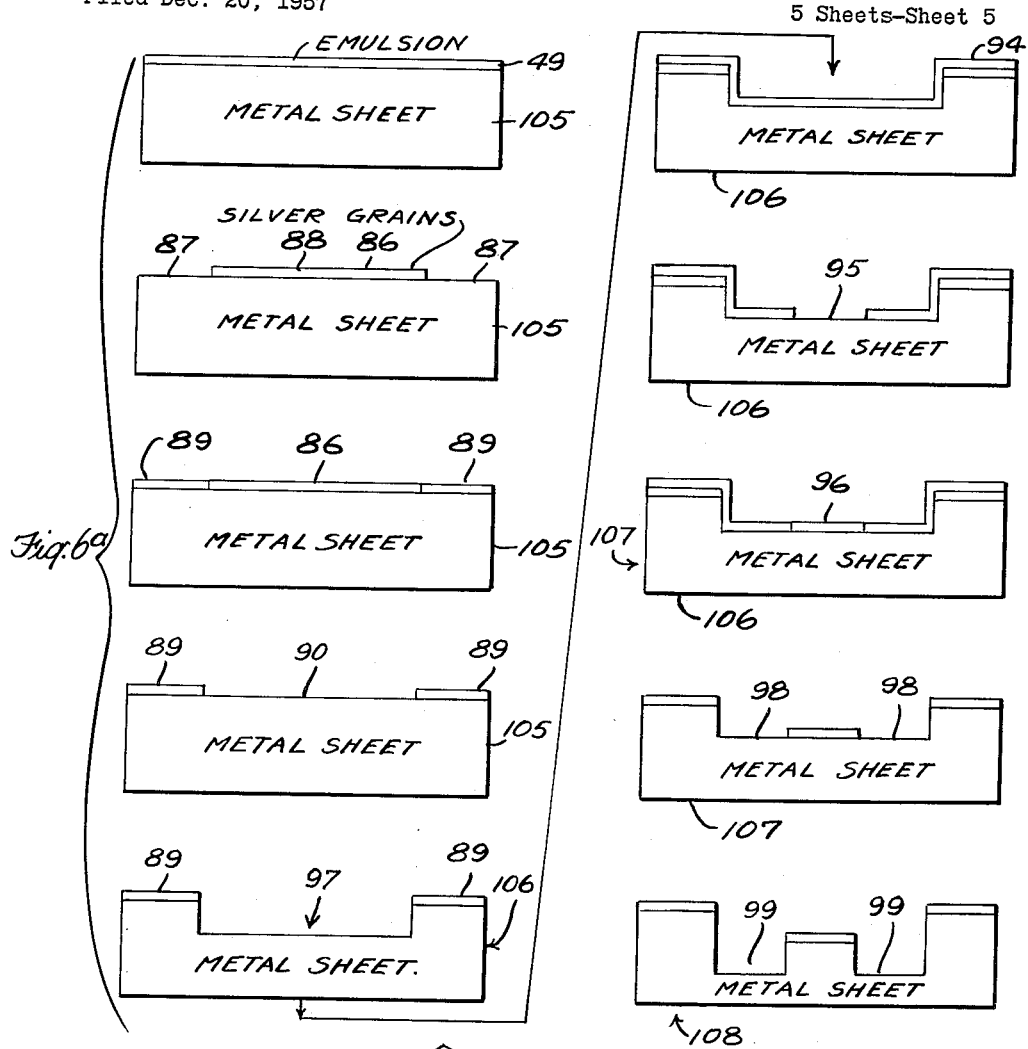
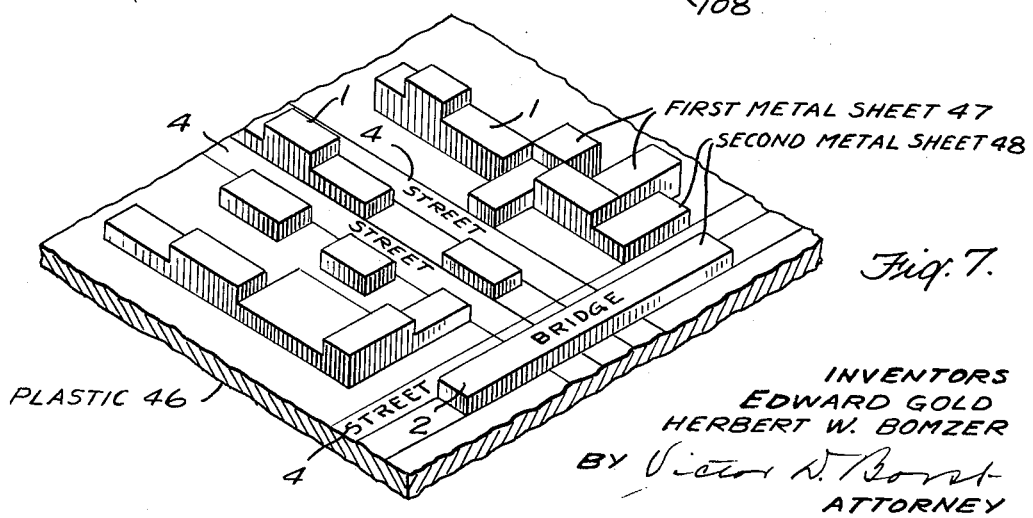
INVENTORS
EDWARD GOLD
HERBERT W. BOMZER
BY
ATTORNEY

United States Patent Office 2,977,228
Patented Mar. 28, 1961

2,977,228
METHOD OF MAKING THREE DIMENSIONAL MODELS

Edward Gold, Plainview, and Herbert W. Bomzer, New Hyde Park, N.Y., assignors to The Sperry Rand Corporation, Ford Instrument Company Division, a corporation of Delaware Filed Dec. 20, 1957, Ser. No. 704,204

2 Claims. (Cl. 96—36)

The present invention relates, in general, to methods for making three dimensional models and more particularly to methods for making three dimensional models of cities for use in predicting radar returns.

In making three dimensional models of cities for use in predicting radar returns the scale factor of 1:50,000 or smaller is usually in order to cover the required area in a reasonable space. At a scale factor of 1:50,000, a 100 foot high building would be represented by 0.024 inch, indicating the magnitude of the problem. It has been the practice, in making three dimensional models using larger scale factors, to relay on normal instrument making techniques, molding processes and hand processing techniques. These techniques and processes are not suited for making models to such small scale factors.

Another important factor in making three dimensional models of cities for use in predicting radar returns is the coding of a map of the area which is to be made into a model.

It is, therefore, an object of the invention to provide a new and improved method for making three dimensional models.

Another object of the invention is to provide a method for making three dimensional models at very small scale factors such as 1:50,000 or smaller.

A still further object of the invention is to provide a method for making three dimensional models from coded maps of areas to be modeled.

A still further object of the invention is to provide a means for predicting radar returns from cities and from surrounding terrain.

To these ends the invention contemplates coding a map of the area which is to be modeled. A photograph of the coded map is taken and a transparency is obtained which shows the coded map as exposed and unexposed areas on the transparency. A sheet of material which is to be made into the model is coated with a photosensitive emulsion and is then exposed through the transparency having the coded map represented on it. The model material is then developed and treated by an etching process, whereby the coded areas of the map are now represented as different heights.

The invention has other objects and advantages which will appear from the following description of a particular embodiment of the invention in conjunction with the accompanying drawings, in which:

Fig. 1 shows a section of an area of a map to be modeled before coding; and

Fig. 2 shows the area to be modeled after coding; and

Figure 6:
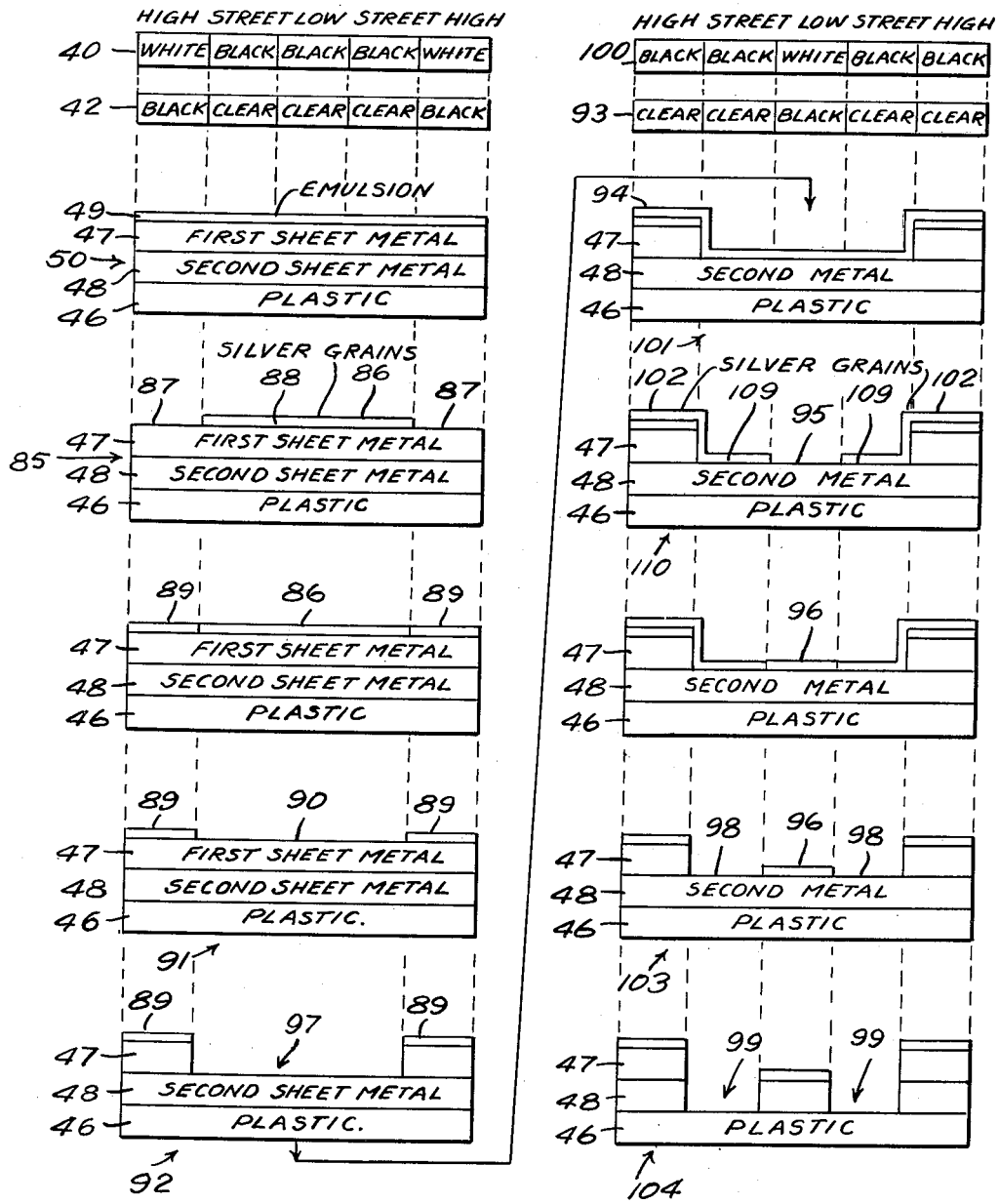

Fig. 3 shows a cross sectional view of the successive steps in making a two height model without plating; and Fig. 3a shows a cross sectional view of the successive steps in making a two height model by an alternate method without plating; and Fig. 4 shows a cross sectional view of the successive steps in making a two height model with plating; and Fig. 4a shows a cross sectional view of the successive steps in making a two height model by an alternate method with plating; and Fig. 5 shows a cross sectional view of the successive steps in making a three height model without plating; and Fig. 5a shows a cross sectional view of the successive steps in making a three height model by an alternate method without plating; and Fig. 6 shows a cross sectional view of the successive steps in making a three height model with plating; and Fig. 6a shows a cross sectional view of the successive steps in making a three height model by an alternate method with plating; and Fig. 7 shows a section of an area of a completed model.

With reference to the drawings of Figs. 1 and 2 a code is selected with which to code a map of the area to be modeled. An example of such a code would be where all buildings, railroads and bridges would be assigned the color of white. All water, terrain and city streets would be assigned the color of black. Informantion as to what is in the area of the map chosen to be modeled could be obtained from street maps, aerial photographs and topographical maps. The coding of the map is done by hand or other appropriate means. Fig. 2 shows the buildings 1 and the bridge 2 cclored white, the water 3 and the streets 4 colored black.

Referring to Fig. 3 the coded map 5 is converted to a three-dimensional model by a photoengraving process, the first step of which is to photograph the coded map onto a film. The film is developed into a negative transparency 6. The developed negative 6 will show the coded colors in the opposite sense. Wherever the coded map 5 has white the negative 6 would have black, and wherever the coded map 5 has black the negative 6 would have clear. The negative 6 is then photographed onto a film and developed. A positive transparency 7 is obtained thereby and wherever the coded map 5 has white the positive 7 would have clear and wherever the coded map 5 has black the positive would have black.

A sheet of laminated material made up of a plastic base 8, which is acid resistant, and a metal top 9, which is non-resistant to acid, is covered with a photosensitive emulsion 10, which is acid resistant. The emulsified sheet of laminated material 11 will act as a photographic plate when exposed to light.

The emulsion covered sheet 11 is exposed to light through the positive 7. The emulsion covered sheet 11 is then developed and wherever the positive 7 is clear the emulsion 10 becomes developed, leaving silver grains 17. Wherever the positive 7 has black the emulsion 10 does not become exposed and upon development is washed away. This results in a developed sheet 12 having exposed areas 13 and unexposed areas 14 of its metal top 9.

The developed sheet 12 is then subjected to an etching acid. Since the acid can only act on non-resistant materials it will eat away only those parts of the metal top 9 which have been left exposed at areas 15. The silver grains 17 remaining are then washed away, leaving a finished two height model 16, the plastic base 8 representing one height and the metal top 9 representing the other height.

In Fig. 3a if one had chosen to use a solid metal sheet instead of a laminated sheet 11 the height that is represented by the plastic base 8 would have been obtained by controlling the length of time that the metal was exposed to the acid, all other steps being the same as those done in Fig. 3, leaving a finished two height model 22.

With reference to Fig. 4 the coded map 5 is used to obtain the negative transparency 6 in the same manner as previously described. The emulsified sheet 11 is exposed to light through the negative transparency 6. The emulsified sheet 11 is then developed and wherever the negative transparency 6 is clear the emulsion 10 would have become developed, leaving silver grains 17. Wherever the negative transparency 6 has black the emulsion 10 would not have been exposed and upon development would be washed away. This results in a developed sheet 18 having exposed areas 19 and unexposed areas 20 of its metal top 9. The exposed areas 19 are then plated at 23, with a material resistant to acid, to a thickness, whereby the combined thicknesses of the plating 23 and the metal top 9 are the thickness of one of the heights wanted in the finished model. After plating the silver grains 17 are washed away leaving an exposed area 24 on plated sheet 25.

The plated sheet 25 is then subjected to an etching acid. Since the acid can only act on non-resistant materials, it will eat away only those parts of the metal top 9 which have been left exposed at 31. This results in a finished two height model 30, where the plastic base 8 represents one height and the combined thicknesses of the metal top 9 and the plating 23 represent the other height.

In Fig. 4a if one had chosen to use a solid metal sheet 32 instead of a laminated sheet 11 the height that is represented by the plastic base 8 would have been obtained by controlling the length of time that the metal was exposed to the acid, all other steps being the same as those done in Fig. 4, leaving a finished two height model 33.

Referring to Fig. 5 the map of the area to be modeled is coded according to the heights of the structures within that area. The high structures and low structures are coded separately such as 40 and 41, respectively. The coded maps are photographed onto films and upon development thereof become negative transparencies 42 and 43, respectively. The developed negatives 42 and 43 will show the coded colors in the opposite sense. Wherever the coded maps 40 and 41 have white the negatives 42 and 43 would have black, and wherever the coded maps 40 and 41 have black the negatives 42 and 43 would have clear. The negatives 42 and 43 are then photographed onto films and developed. Positive transparencies 44 and 45 are obtained thereby and wherever the coded maps 40 and 41 have white the positives 44 and 45 would have clear, and wherever the coded maps 40 and 41 have black the positives 44 and 45 would have black.

A sheet of laminated material made up of a plastic base 46, which is acid resistant, a first layer of metal 47 which is non-resistant to acid, and a second layer of metal 48 which is non-resistant to acid, is covered with a photosensitive emulsion 49, which is acid resistant. The emulsified sheet of laminated material 50 will act as a photographic plate when exposed to light.

Although, the first metal layer 47 and the second metal layer 48 are non-resistant to acids, the first metal layer 47 is resistant to the acid which affects the second metal layer 48 and vice versa.

The emulsion covered sheet 50 is exposed to light through the positive 44. The emulsion covered sheet 50 is then developed and wherever the positive 44 is clear the emulsion 49 becomes developed, leaving silver grains 51. Wherever the positive 44 has black the emulsion 49 does not become exposed and upon development is washed away. This results in a developed sheet 52 having exposed areas 53 and unexposed areas 54 of its first metal layer 47.

The developed sheet 52 is then subjected to an etching acid which affects the first metal layer 47 but which has no effect upon the second metal layer 48 or upon the silver grains 51. As a result, only those parts of the first metal layer 47 which were left exposed at 53, were eaten away as shown at 55. The silver grains 51 remaining are then washed away leaving a model 56 representing only the higher buildings.

The model 56 is then coated with a photosensitive emulsion 57, which is acid resistant. The emulsion covered model 58 will act as a photographic plate when exposed to light. The emulsion covered model 58 is then exposed to light through the positive 45. Model 58 is then developed and wherever the positive 45 is clear the emulsion 57 becomes developed, leaving silver grains 59. Wherever the positive 45 has black the emulsion 57 does not become exposed and upon development is washed away. This results in a developed model 60 having exposed areas 70 and unexposed areas 71 of its second metal layer 48.

The model 60 is then subjected to an etching acid which affects the second metal layer 48 but which has no effect upon the first metal layer 47 or upon the silver grains 59. As a result, only those parts of the second metal layer 48 which were left exposed at 70 were eaten away as shown at 72. The silver grains 59 remaining are then washed away leaving a finished model 80 having three different heights.

In Fig. 5a had one chosen to use a solid metal sheet 81 instead of a laminated sheet 50 the different heights obtained would have been obtained by controlling the length of time that the metal was exposed to the acid, all other steps being substantially the same as those shown in Fig. 5, leaving a finished three height model 83.

With reference to Fig. 6 the coded maps 40 and 100 are used to obtain the negative transparencies 42 and 93, respectively, in the same manner as previously described. The emulsion covered sheet 50 is exposed to light through the negative transparency 42. The emulsion covered sheet 50 is then developed and wherever the negative transparency 42 is clear the emulsion 49 would have become developed, leaving silver grains 86. Wherever the negative transparency 42 has black the emulsion 49 does not become exposed and upon development is washed away. This results in a developed sheet 85 having exposed areas 87 and unexposed area 88 of its first metal layer 47.

The exposed areas 87 are then plated at 89, with a material resistant to acid, to a thickness, whereby the combined thickness of the plating 89 and the first and second metal layers 47 and 48, respectively, are the thickness of one of the heights wanted in the finished model. After plating the silver grains 86 are washed away leaving an exposed area 90 on plated laminate 91.

The plated laminate 91 is then subjected to an etching acid which affects the first metal layer 47 but which has no effect upon the second metal layer 48 or upon the plating 89. As a result, only those parts of the first metal layer 47 which were left exposed at 90, were eaten away at 97, leaving a model 92 representing only the higher buildings.

The model 92 is then coated with a photosensitive emulsion 94, which is acid resistant. The emulsion covered model 101 will act as a photographic plate when exposed to light. The emulsion covered model 101 is then exposed to light through the negative 93. Model 101 is then developed and wherever the negative 93 is clear the emulsion 94 becomes developed, leaving silver grains 102. Wherever the negative 93 has black the emulsion 94 does not become exposed and upon development is washed away. This results in a developed model 110 having exposed area 95 and unexposed areas 109 of its second metal layer 48.

The exposed area 95 is then plated at 96, with a material resistant to acid, to a thickness, whereby the combined thickness of the plating 96 and the second metal layer 48 are the thicknesses of one of the heights wanted in the finished model. After plating the silver grains 102 are washed away leaving exposed area 98 on the plated model 103.

The model 103 is then subjected to an etching acid which affects the second metal layer 48 but which has no effect upon the first metal layer 47. As a result, only those parts of the second metal layer 48 which were left exposed at 98, were eaten away at 99, leaving a finished model 104 having three different heights.

In Fig. 6a had one chosen to use a solid metal sheet 105 instead of a laminated sheet 50 the different heights obtained would have been obtained by controlling the length of time that the metal was exposed to the acid, all other steps being substantially the same as those done in Fig. 6, leaving a finished three height model 108.

In this particular embodiment of our invention it has been found that a suitable plating material is solder made up of 60% lead. In fabricating the laminate if copper and aluminum are the two metal layers then an acid such as nitric acid ($HNO_3$) will affect the copper without affecting the aluminum and an acid such as hydrochloric (HCl) will affect the aluminum without affecting the copper.

From the foregoing it will be apparent to those skilled in this art that we have provided a greatly improved method for accurately producing three dimensional models, and that we are entitled to cover any variations which may be made in the method described which are within the scope of the appended claims.

What is claimed is:

1. The method of making a three dimensional model of a subject having parts thereof of different heights by providing a pair of graphic illustrations of the subject, coloring white the areas representing the highest heights in one of said illustrations, and coloring black the remaining portions of said one illustration, coloring white the areas representing the highest and also the intermediate heights in the other of said illustrations, and coloring black the remaining portions of said other illustration, photographing the pair of illustrations onto films to obtain a pair of photographic transparencies one of which represents by transparent portions on an opaque background the highest heights of said parts and the other of which represents also by transparent portions on an opaque background the highest heights and also the intermediate heights of said parts, providing a sheet of material composed of a plurality of laminations each of which is non-resistive to certain acids and resistive to certain other acids, coating said sheet with a photosensitive emulsion which is acid resistant thereby providing a photographic plate, exposing said photographic plate to a light source through the said one transparency representing the highest height, developing said plate thereby causing the coding on said one transparency to be represented as unprotected and protected areas on said plate, etching the unprotected areas the depth of the top lamination of said sheet, the successive laminating of said sheet being resistant to the acid used in etching said top lamination, washing away the emulsion remaining on the protected area, recoating said sheet with said photosensitive emulsion thereby providing a second photographic plate, exposing said second photographic plate to a light source through the said other transparency representing both said heights, developing said second plate thereby causing the coding on said other transparency to be represented as unprotected and protected areas on said second photographic plate, etching the unprotected areas on said second plate the depth of the next lamination of said sheet, the top lamination and successive laminations being resistant to the acid used in etching the said next lamination, and washing away the emulsion remaining on said second plate.

2. The method of making three dimensional models of a selected area having objects of different heights therein, which comprises preparing a pair of maps of said area on which said objects are indicated, coloring white the areas representing the highest heights on one of said maps, and coloring black the remaining portion of said one map, coloring white the areas representing the highest and also the intermediate heights on the other of said maps, and coloring black the remaining portions of said other map, photographing the pair of maps onto films to obtain a pair of photographic transparencies one of which represents by transparent portions on an opaque background the highest heights of said objects and the other of which also represents by transparent portions on an opaque background the highest heights and also the intermediate heights of said objects, providing a sheet of material composed of a plurality of laminations each of which is non-resistive to certain acids and resistive to certain other acids, coating said sheet with a photosensitive emulsion which is acid resistant thereby providing a photographic plate, exposing said photographic plate to a light source through the said one transparency representing the highest height, developing said plate thereby causing the coding on said one transparency to be represented as unprotected and protected areas on said plate, etching the unprotected areas the depth of the top lamination of said sheet, the successive laminating of said sheet being resistant to the acid used in etching said top lamination, washing away the emulsion remaining on the protected areas, recoating said sheet with said photosensitive emulsion thereby providing a second photographic plate, exposing said second photographic plate to a light source through the said other transparency representing both said heights, developing said second plate thereby causing the coding on said other transparency to be represented as unprotected and protected areas on said second photographic plate, etching the unprotected areas on said second plate the depth of the next lamination of said sheet, the top lamination and successive laminations being resistant to the acid used in etching the said next lamination, and washing away the emulsion remaining on said second plate.

References Cited in the file of this patent

UNITED STATES PATENTS

| | | |
|---|---|---|
| 1,285,015 | Browning | Nov. 19, 1918 |
| 2,130,735 | Eckardt | Sept. 20, 1938 |
| 2,257,143 | Wood | Sept. 30, 1941 |
| 2,650,878 | Boyer | Sept. 1, 1953 |
| 2,662,957 | Eisler | Dec. 18, 1953 |
| 2,758,074 | Black | Aug. 7, 1956 |
| 2,854,336 | Gutnecht | Sept. 30, 1958 |

FOREIGN PATENTS

| | | |
|---|---|---|
| 916,237 | Germany | Aug. 5, 1954 |
| 685,467 | Germany | Dec. 18, 1939 |